(No Model.)
H. C. JONES.
ELECTRICAL CUT-OUT.
No. 580,320.
Patented Apr. 6, 1897.
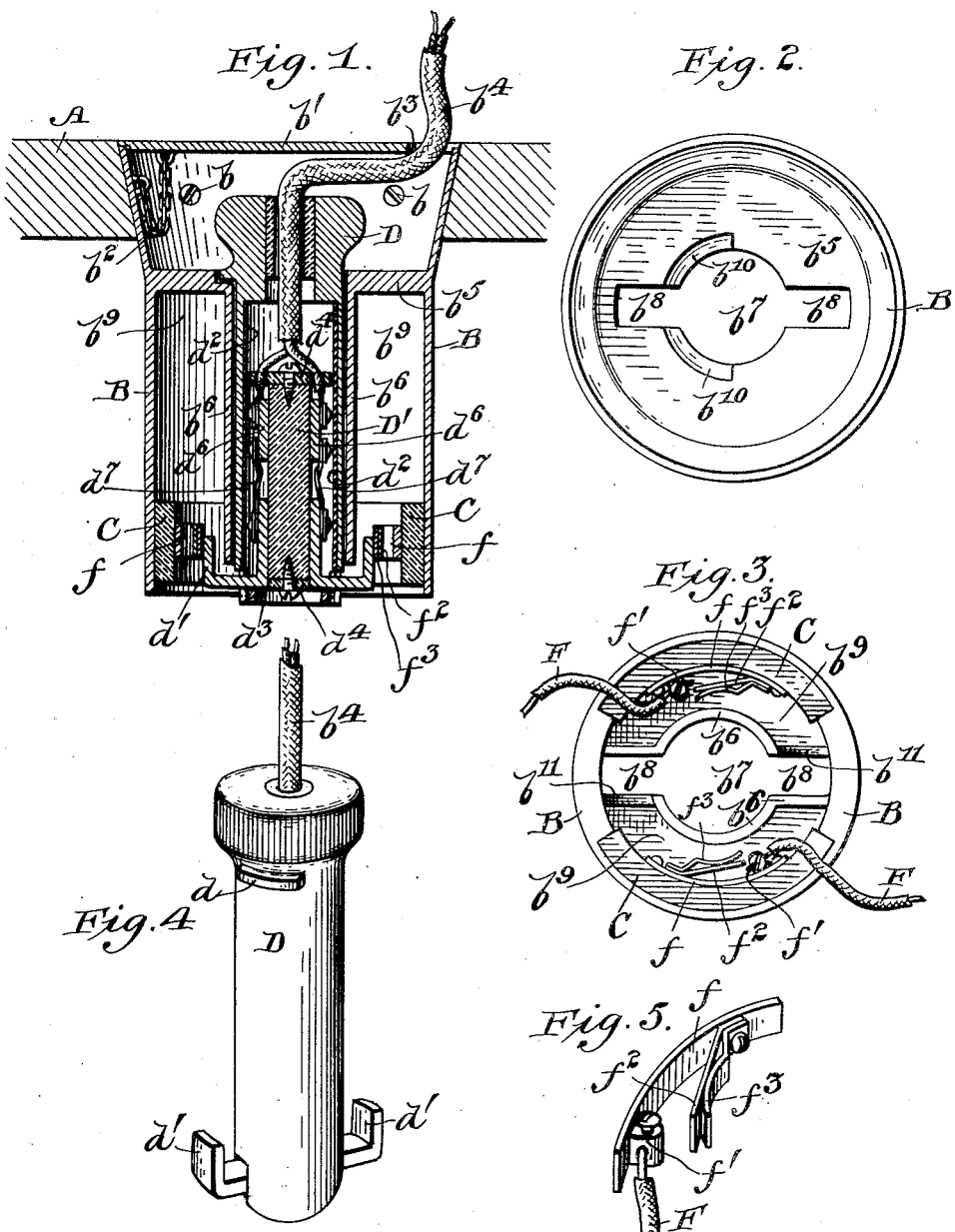
WITNESSES
INVENTOR

UNITED STATES PATENT OFFICE.

HERBERT CLAYTON JONES, OF NEW YORK, N. Y.

ELECTRICAL CUT-OUT.

SPECIFICATION forming part of Letters Patent No. 580,320, dated April 6, 1897.

Application filed August 12, 1896. Serial No. 602,536. (No model.)

*To all whom it may concern:*

Be it known that I, HERBERT CLAYTON JONES, a citizen of the United States, residing at New York city, in the county of New York and State of New York, have invented certain new and useful Improvements in Electrical Cut-Outs; and I do hereby declare the following to be a full, clear, and exact description of the invention, such as will enable others skilled in the art to which it appertains to make and use the same.

My invention relates to improvements in electrical cut-outs; and it consists of the combination of a suitable exterior casing provided with a longitudinal passage, recesses in its under side, pendent protecting-walls inclosing the longitudinal passage and forming with the outer wall of the casing the recesses, contacting points within the recesses between the pendent walls and the exterior casing and connected to the main-circuit wires, and a cut-out plug having suitable contacting points and adapted to be slipped into the longitudinal passage of the casing and turned to bring the contacting points together.

It also consists of certain other novel constructions, combinations, and arrangements of parts, all of which will be hereinafter more particularly set forth and claimed.

In the accompanying drawings, forming part of this specification, Figure 1 represents a central vertical section through the devices embodying my invention applied to a floor. Fig. 2 represents a top plan view of the same with the cut-out plug removed. Fig. 3 represents a bottom plan view of said devices with the cut-out plug removed. Fig. 4 represents a detail perspective view of the cut-out plug, and Fig. 5 represents a detail perspective view of one of the contacting plates of the insulating-plug.

A in the drawings represents the floor; B, the external casing; C, the insulating segmental pieces, and D the cut-out plug.

The casing is preferably constructed of aluminium, but may be formed of other metals or any other suitable material. This casing is intended to be applied in floors, as shown in Fig. 1, being secured therein by a screw $b$. A cover $b'$ closes the upper open end of said casing and when in position is flush with the floor, so as to form no obstruction on the same. This cover is movably secured to the casing B by a chain $b^2$ and is provided with a notch $b^3$ in its periphery, said notch forming a passage for the flexible conducting-wire $b^4$. A horizontal partition $b^5$ is secured in the casing a short distance below the top of said casing and is provided with a central circular opening. Oppositely-arranged radial openings extend from said central opening to the sides of the casing B. Depending from the edges of these openings are vertical inclosing walls $b^6$ $b^6$, forming a central longitudinal passage $b^7$ and radial longitudinal passages $b^8$ $b^8$ on opposite sides of the passage $b^7$ and communicating therewith. The partition $b^5$ and the depending walls $b^6$ $b^6$ are preferably made integral with the casing B to prevent any chance of moisture getting into the semi-annular recesses $b^9$ $b^9$, formed by the said parts. Two short segmental recesses $b^{10}$ $b^{10}$ are so formed about the periphery of the passage $b^7$ as to receive a stop projection $d$ of the plug D and permit the movement of the same, but only to a limited extent.

In the lower portions of the semiannular recesses $b^9$ $b^9$ are segmental insulating-pieces C, secured by screws or otherwise to the casing B on diametrically opposite sides of the same. Spring-contacts are secured to the insulating-pieces C by screws diametrically opposite to each other, and each comprises a segmental plate $f$, provided with a binding-post $f'$, in which the main-circuit wires F F are secured, and double spring contacting pieces $f^2$ and $f^3$, respectively. The piece $f^2$ is simply bent at a tangent from its supporting-plate, but the piece $f^3$, which is in front and resting against the same, is formed in a scallop, which is adapted to receive and hold its respective contacting piece $d'$ of the plug D. The wires F F pass into the lower open ends of the recesses $b^9$ to the said posts $f'$.

It will be observed that in forming the semiannular recesses $b^9$ the contacts $f^2$ and $f^3$, secured therein, are protected by the depending walls $b^6$ $b^6$ from any foreign substance passing down the passages $b^7$ and $b^8$.

The cut-out plug is preferably hollow and made of aluminium, though it may be made of any suitable material. It is lined with suitable insulating material $d^2$ and is provided with diametrically oppositely-arranged notches at its lower end to accommodate the contacts $d'$. The projection $d$ is formed near its upper end for the purpose hereinbefore described. An elongated block $D'$, of suitable insulating material, is removably held in the hollow plug, preferably by an annular nut $d^3$, engaging internally-arranged threads on the lower end of the said plug. The block $D'$ is held in the center of the plug D by spacing-pieces $d^4$ $d^4$, of insulating material, secured to the ends of said block. The flexible conducting-cord $b^4$ enters the plug D through an opening in the top, suitably insulated, and the wires composing the said cord enter the plug, the positive wires passing through a passage in the upper spacing-piece $d^4$ and the negative wires passing through another passage in said spacing-piece. These wires are attached, respectively, to plates $d^6$ $d^6$, secured to opposite sides of the insulating-block $D'$. Angular contacting pieces $d'$ $d'$ are secured upon the opposite sides of said block $D'$ below the plates $d^6$ $d^6$ at its lower end in such a manner that their angular portions project outward and upward. Each of these contacting pieces is connected to the plate $d^6$ on its respective side of the insulating-block $D'$ by a soft-metal fuse-wire $d^7$.

It will be observed from the aforegoing that the cut-out plug is inserted in the casing by causing the angular contacting pieces $d'$ $d'$ to coincide with the passages $b^8 b^8$ and then shoving the plug downward until stopped by the stop $d$. When it is desired to turn the current into the electrical device connected to the flexible conductor, the cut-out plug is simply rotated, which brings its contacting pieces into contact with the spring-contacts in the semiannular recesses in the casing. The lower ends of the walls $b^6$ are cut away, as at $b^{11}$, sufficiently to permit of the contacts $d'$ passing from the passages $b^8$ to the recesses $b^9 b^9$, and vice versa, when the plug is turned.

It will be seen that if water, nails, or any other foreign substances get into the top of the casing A it cannot short-circuit the cut-out, but would simply drop down through the same without coming in contact with the spring contact-pieces, and this whether the cut-out plug is in or out of the casing.

When the connection is broken at the contacting points by turning the plug half around, the action is so quick, because of the peculiar formation of the spring-contact, that there is no chance for the current to arc. This I deem of great importance, as it preserves perfectly bright contacting points and at the same time prevents the rapid destruction of the contacting points which always follow such arcing.

Having thus described my invention, what I claim as new, and desire to secure by Letters Patent, is—

1. In an electrical cut-out, the combination of a suitable casing, provided with a longitudinal passage, recesses in its under side, and pendent protecting-walls surrounding the longitudinal passage, insulated contacting points within the recesses between the pendent walls and the casing and connected to the main-circuit wires, a cut-out plug having suitable contacting points and adapted to be slipped into the longitudinal passage of the casing and turned to bring the contacting points together, substantially as described.

2. In an electric cut-out, the combination of a suitable casing, interior depending protecting-walls in said casing forming a central longitudinal circular passage, rectangular passages radiating from the same, and recesses upon the under side, insulated contacting points in said recesses between the pendent walls and the outer casing and connected to the main-circuit wires, a cut-out plug having laterally-extending contacting points and adapted to be slipped into the longitudinal passage of the casing, and turned to bring the contacting points together, substantially as described.

3. In an electric cut-out, the combination of a suitable exterior casing provided with a longitudinal passage and recesses on its under side, and a pendent wall about the longitudinal passage, insulating-pieces in said recesses, contacting points secured to said insulating-pieces in said recesses and between the pendent wall and the outer wall of the casing and connected to the main-circuit wires, a cut-out plug having contacting points and adapted to be slipped into the longitudinal passage of the casing and turned to bring the contacting points together, substantially as described.

4. In an electric cut-out, the combination of a suitable exterior casing provided with a longitudinal passage and recesses on its under side, and a pendent wall about the longitudinal passage, insulating-pieces in said recesses, spring contacting points secured to said insulating-pieces in said recesses and between the pendent wall and the outer wall of the casing and connected to the main-circuit wires, a cut-out plug having contacting points and adapted to be slipped into the longitudinal passage of the casing and turned to bring the contacting points together, substantially as described.

5. In an electric cut-out, the combination of a suitable exterior casing, provided with a vertical longitudinal passage, recesses in its under side, and a pendent wall, contacting points in said recesses and between the pendent wall and the outer wall of the casing, and connected to the main-circuit wires, a cut-out plug having laterally-projecting contacting points and suitable fuse-wires and adapted to be slipped into the longitudinal passage of the casing and turned to bring the contacting points together, substantially as described.

6. In an electric cut-out, the combination of a suitable exterior casing, provided with a longitudinal passage, recesses in its under side and a pendent wall, spring contacting points in said recesses and between the pendent wall and the outer wall of the casing, a cut-out plug having contacting points at its lower end and a stop to limit its rotary movement and adapted to be slipped into the longitudinal passage of the casing and turned to bring the contacting points together, substantially as described.

7. In an electric cut-out, the combination of a suitable exterior casing, provided with a longitudinal passage, recesses in its under side, and a pendent wall, contacting points within said recesses and between the pendent wall and the outer wall of the casing and connected to the main-circuit wires, a cut-out plug having laterally and upwardly extending contacting points and adapted to be slipped into the longitudinal passage of the insulating-plug and turned to bring the contacting points together, substantially as described.

8. In an electric cut-out, the combination of a suitable casing, provided with a longitudinal passage, recesses in its under side, and insulated contact-points connected with the main-circuit wires, a hollow cut-out plug, an insulating-lining within the same, contacting points secured to the interior of the plug and extending out through the sides thereof but without touching the same, the said plug being adapted to be slipped into the longitudinal passage of the casing and turned to bring the contacting points together, substantially as described.

9. In an electric cut-out, the combination of a suitable casing provided with a longitudinal passage, recesses in its under side, and insulated contact-points connected with the main-circuit wires, a hollow cut-out plug, an insulating-lining for the same, an insulating-block removably secured in said hollow plug, conducting-wire secured to the block, and contact-points secured to the lower end of the same, the said plug being adapted to be slipped into the longitudinal passage of the casing, and turned to bring the contacting points together, substantially as described.

In testimony whereof I hereunto affix my signature in presence of two witnesses.

HERBERT CLAYTON JONES.

Witnesses:
J. T. BIDSTRUP,
STEPHEN W. LININGTON.